United States Patent
Strzepek

(10) Patent No.: US 10,386,071 B2
(45) Date of Patent: Aug. 20, 2019

(54) COMBUSTOR SHAPE COOLING SYSTEM

(71) Applicant: Pratt & Whitney Canada Corp., Longueuil (CA)

(72) Inventor: Jakub Strzepek, Rzeszow (PL)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 355 days.

(21) Appl. No.: 15/233,143

(22) Filed: Aug. 10, 2016

(65) Prior Publication Data
US 2017/0045229 A1    Feb. 16, 2017

(30) Foreign Application Priority Data

Aug. 13, 2015 (EP) .................... 15461552

(51) Int. Cl.
| | |
|---|---|
| *F02C 3/04* | (2006.01) |
| *F23R 3/00* | (2006.01) |
| *F23R 3/06* | (2006.01) |
| *F23R 3/08* | (2006.01) |
| *F23R 3/46* | (2006.01) |
| *F23R 3/50* | (2006.01) |

(52) U.S. Cl.
CPC ............... *F23R 3/08* (2013.01); *F02C 3/04* (2013.01); *F23R 3/002* (2013.01); *F23R 3/06* (2013.01); *F23R 3/46* (2013.01); *F23R 3/50* (2013.01); *F05B 2240/35* (2013.01); *F23R 2900/03042* (2013.01); *Y02T 50/675* (2013.01)

(58) Field of Classification Search
CPC .... F23R 3/08; F23R 3/06; F23R 3/002; F23R 3/04; F23R 3/46; F23R 3/50; F23R 3/60; F23R 3/02; F05B 2250/15
See application file for complete search history.

(56) References Cited

U.S. PATENT DOCUMENTS

| | | |
|---|---|---|
| 3,038,309 A | 6/1962 | Waters |
| 3,307,354 A | 3/1967 | Macaulay et al. |
| 3,751,910 A | 8/1973 | Sweeney et al. |
| 4,773,227 A | 9/1988 | Chabis |
| 4,887,663 A | 12/1989 | Auxier et al. |

(Continued)

FOREIGN PATENT DOCUMENTS

| | | |
|---|---|---|
| GB | 733485 | 7/1955 |
| JP | 56-108026 A | 8/1981 |
| WO | WO2015/074052 | 5/2015 |

OTHER PUBLICATIONS

European Search Report dated Jan. 20, 2016 in corresponding EP Application No. 15461552.0.

*Primary Examiner* — Steven M Sutherland
*Assistant Examiner* — Thuyhang N Nguyen
(74) *Attorney, Agent, or Firm* — Norton Rose Fulbright Canada LLP

(57) ABSTRACT

A gas turbine engine includes a combustor which has at least one annular wall defining a combustion chamber therein. The annular wall is formed by a circumferential array of panels overlapping one with another to define a plurality of radial gaps between respective adjacent two panels. The radial gaps are configured in a spiral pattern and are in fluid communication with the combustion chamber and a space outside the combustor to allow air surrounding the annular wall to enter the combustion chamber via the radial gaps for film cooling.

18 Claims, 6 Drawing Sheets

(56) References Cited

U.S. PATENT DOCUMENTS

| | | | |
|---|---|---|---|
| 8,146,364 B2* | 4/2012 | Johnson | F23R 3/002 |
| | | | 431/114 |
| 8,707,706 B2* | 4/2014 | Garry | F23R 3/002 |
| | | | 60/752 |
| 2004/0250548 A1* | 12/2004 | Howell | F23R 3/002 |
| | | | 60/796 |

* cited by examiner

COMBUSTOR SHAPE COOLING SYSTEM

CROSS REFERENCE TO RELATED APPLICATION

This application claims priority on European Application No. 15461552.0 filed Aug. 13, 2015, the entire content of which is incorporated herein by reference.

TECHNICAL FIELD

The application relates generally to gas turbine engines and, more particularly, to a gas turbine engine combustor having a cooling system.

BACKGROUND OF THE ART

Gas turbine engines have combustors wherein a combustion reaction takes place and generates hot combustion gases to power the turbine of the gas turbine engine. The combustor, particularly an inner side of the combustor wall referred to as the "hot side", is exposed to high temperature gases and must be cooled. Therefore, it is necessary to provide a combustor with a cooling system. Conventional cooling systems are usually defined by holes such as impingement cooling holes, effusion cooling holes, etc. provided in combustor walls or components attached to the combustor walls. Some gas turbine combustors have successive wall sections such as telescoping rings that overlap one another to define entrances therebetween for film cooling air which flows rearwardly along the inside of the combustor wall in the same direction as the combustion gases. However, in present day and future aircraft engines, it is apparent that higher and higher temperatures will be used, which requires more effective combustor cooling systems.

Accordingly, there is a need for gas turbine engine combustor configurations having improved cooling systems.

SUMMARY

In one aspect, there is provided a gas turbine engine having a gas generation section including a combustor, the combustor comprising at least one annular wall defining a combustion chamber therein, the at least one annular wall formed by a circumferential array of panels in a loadbearing configuration for bearing loads generated by a combustion reaction taking place in the combustion chamber, the panels extending from an upstream end to a downstream end of the at least one annular wall and overlapping one with another to define a plurality of radial gaps between respective adjacent two of the panels, the radial gaps being configured in a spiral pattern and being in fluid communication with the combustion chamber and a space outside the combustor to allow air surrounding the at least one annular wall to enter the combustion chamber via the radial gaps for film cooling a hot side of the at least one annular wall.

In another aspect, there is provided a gas turbine engine having a gas generator section including an annular combustor disposed in an annulus defined radially between annular outer and inner cases of the gas generator section, the combustor comprising an annular outer wall and an annular inner wall to define an annular combustion chamber radially therebetween, each of the annular outer and inner walls being formed by a circumferential array of panels in a loadbearing configuration for bearing loads generated by a combustion reaction taking place in the combustion chamber, the panels extending from an upstream end to a downstream end of the respective annular outer and inner walls and overlapping one with another to define a plurality of radial gaps between respective adjacent two of the panels, the radial gaps in the respective annular outer and inner walls being configured in spiral patterns and being in fluid communication with the combustion chamber and a space outside the annular combustor to allow air in the annulus and surrounding the annular combustor to enter the combustion chamber via the radial gaps for film cooling a hot side of the respective annular outer and inner walls.

DESCRIPTION OF THE DRAWINGS

Reference is now made to the accompanying drawings in which.

It will be noted that throughout the appended drawings, like features are identified by like reference numerals.

DETAILED DESCRIPTION

Figure 1:
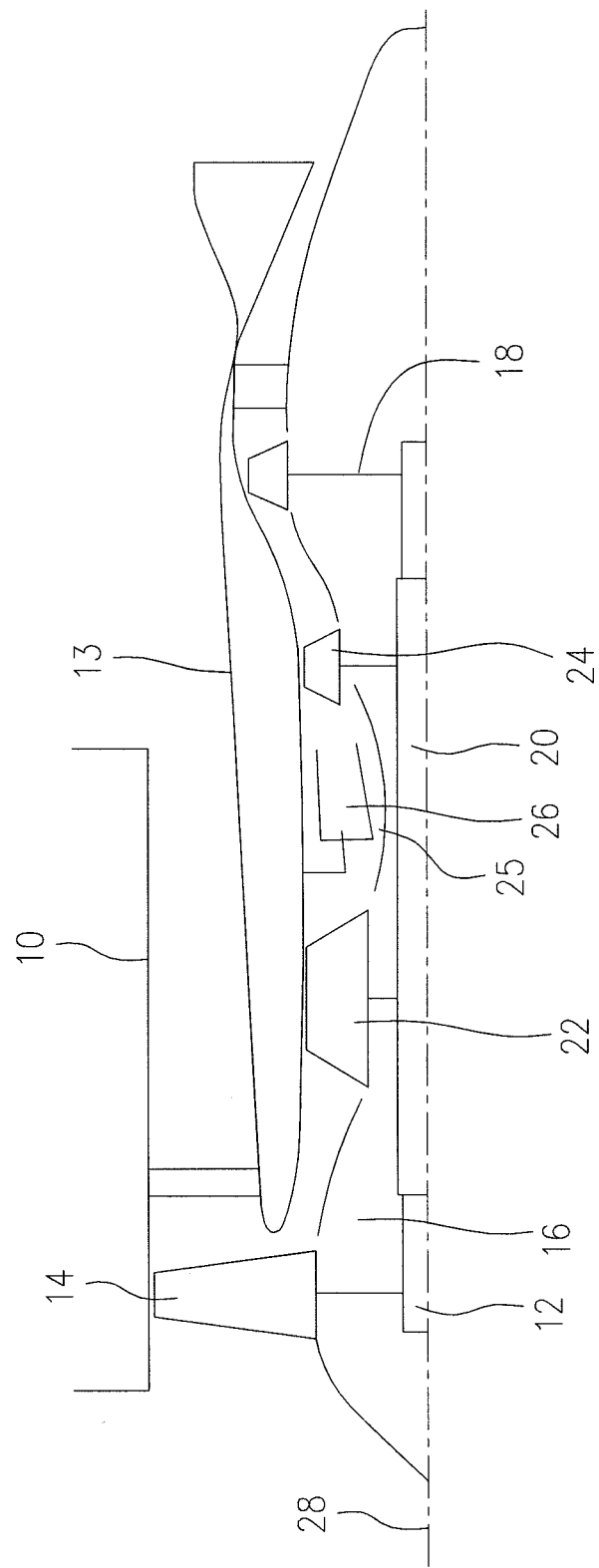
FIG. 1 is a schematic side cross-sectional view of a gas turbine engine as an example illustrating application of the described subject matter.

Referring to FIG. 1 a turbofan gas turbine engine includes a fan case 10, a core casing 13, a low pressure spool assembly which includes a fan assembly 14, a low pressure compressor assembly 16 and a low pressure turbine assembly 18 connected by a shaft 12, and a high pressure spool assembly which includes a high pressure compressor assembly 22 and a high pressure turbine assembly 24, connected by a turbine shaft 20. The core casing 13 surrounds the low and high pressure spool assemblies to define a main fluid path therethrough. The engine includes a gas generation section 25 including a combustor assembly 26 provided in the main fluid path to generate combustion gases to power the high pressure turbine assembly 24 and the low pressure turbine assembly 18.

The terms "axial", "radial" and "circumferential" used for various components below, are defined with respect to the main engine axis 28. The terms "upstream" and "downstream" used for various components below, are defined with respect to the flow direction of air or gases flowing in and/or through the main fluid path of the engine.

Figure 2:
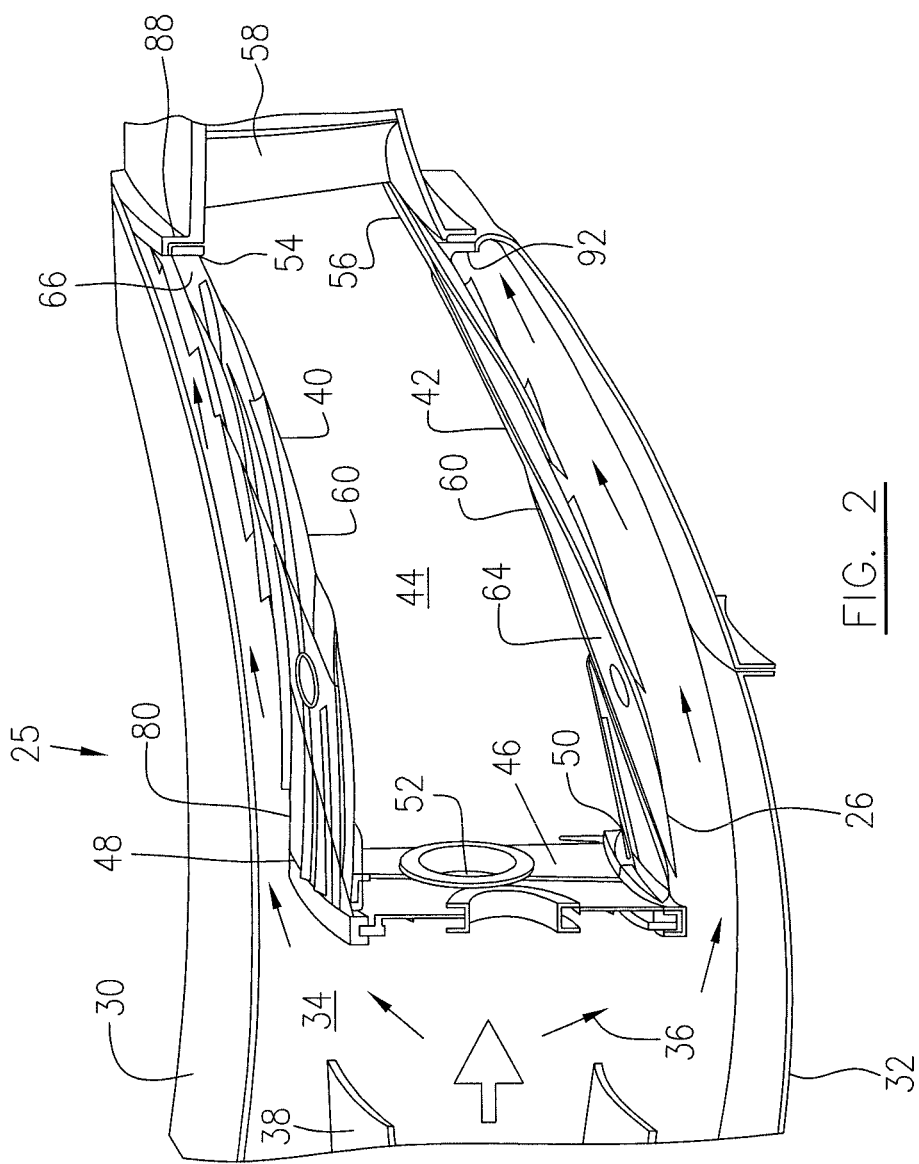
FIG. 2 is a partial perspective view of a circumferential segment of a gas generation section of the engine of FIG. 1, showing a combustor assembly according to one embodiment.

Referring to FIGS. 1 and 2, the gas generation section 25 of the engine according to one embodiment may be configured with annular outer and inner casings 30, 32 (which are also part of the core casing 13 of the engine) to define an annulus 34 radially therebetween for accommodating compressor air (indicated by arrows 36) discharged from a compressor diffuser 38. The combustor assembly 26 may be disposed in the annulus 34 and supported by the annular outer and inner casings 30, 32. The combustor assembly 26 may be positioned radially spaced apart from the respective annular outer and inner casings 30, 32 and is thus surrounded by the compressor air 36 within the annulus 34.

The combustor assembly 26 may be configured with an annular outer wall 40 and an annular inner wall 42 to define an annular combustion chamber 44 radially therebetween. An annular dome wall 46 which may be connected to respective upstream ends 48, 50 of the annular outer and inner walls 40, 42, may extend to radially close the annular combustion chamber 44 at the upstream ends 48, 50 of the respective annular outer and inner walls 40, 42. A plurality of openings 52 may be provided in the annular dome wall 46 for receiving a number of fuel/air mixers (not shown) installed therein to inject a fuel and air mixture into the annular combustion chamber 44 to be burned therein, resulting in a combustion reaction to produce hot combustion gases. Downstream ends 54, 56 of the respective annular outer and inner walls 40, 42 may be connected to a nozzle structure 58 which directs the hot combustion gases produced within the annular combustion chamber 44, into the high pressure turbine assembly 24.

Referring to FIGS. 1-7, according to one embodiment, the annular outer and inner walls 40, 42 may each be formed by a circumferential array of swept-back combustor panels 60 extending in a spiral pattern from the upstream ends 48, 50 to the downstream ends 54, 56 of the respective annular outer and inner walls 40, 42, and may overlap one with another to define a plurality of radial gaps 62 (see FIGS. 3, 6 and 7) between respective adjacent two of the swept-back combustor panels 60. Therefore, the radial gaps 62 are configured in a spiral pattern corresponding to the spiral pattern of the swept-back combustor panels 60. The radial gaps 62 may be in fluid communication with the annular combustor chamber 44 and a space outside the annular combustor assembly 26 to allow the compressor air 36 in the annulus 34 which surrounds the annular combustor 26, to enter the annular combustion chamber 44 via the radial gaps 62 in the respective annular outer and inner walls 40, 42, for film cooling a hot side 64 of the respective annular outer and inner walls 40, 42 which is heated by exposure to the hot gases generated in the annular combustion chamber 44.

The radial gaps 62 defined in the annular outer wall 40 may be configured in a first spiral pattern in which the gaps 62 extend from the upstream end 48 to the downstream end 54 of the annular outer wall 40 and incline toward a first circumferential direction, and the radial gaps 62 defined in the annular inner wall 42 may be configured in a second spiral pattern in which the radial gaps 62 extend from the upstream end 50 to the downstream end 56 of the annular inner wall 42 and incline toward a second circumferential direction opposite the first circumferential direction. The gaps 62 in spiral patterns having opposite circumferential directions can improve combustion recirculation within the combustion chamber 44. Alternatively, the first and second spiral patterns of the radial gaps 62 in the respective annular outer and inner walls 40, 42 may be similar: that is, the radial gaps 62 defined in the respective outer and inner walls 40, 42 may all incline toward the same circumferential direction.

According to one embodiment, the swept-back combustor panels 60 may each include a first panel side edge 68 extending between a panel forward end edge 70 and a panel aft end edge 72, and a second panel side edge 74 extending between the panel forward end edge 70 and the panel aft end edge 72. The first and second panel side edges 68, 74 may be oriented at a respective oblique angle with respect to the panel forward end edge 70. For example, the first panel side edge 68 may be oriented at an obtuse angle A (see FIG. 5) with respect to the panel forward end edge 70 and the second panel side edge 74 may be oriented at an acute angle B with respect to the panel forward end edge 70. Therefore, each of the combustor panels 60 are presented as swept-back profile.

The panel forward end edges 70 of the respective swept-back combustor panels 60 which form the annular outer wall 40, may in combination form the upstream end 48 of the annular outer wall 40 while the panel aft end edges 72 of the respective swept-back combustor panels 60 which form the annular outer wall 40, may in combination form the downstream end 54 of the annular outer wall 40. Similarly, the panel forward end edges 70 of the swept-back combustor panels 60 which form the annular inner wall 42, may in combination form the upstream end 50 of the annular inner wall 42 and the panel aft end edges 72 of the swept-back combustor panels 60 which form the annular inner wall 42, may in combination form the downstream end 56 of the annular inner wall 42.

According to one embodiment the swept-back combustor panels 60 forming the respective annular outer and inner walls 40, 42 may be connected together by respective front and aft connectors and may be supported by a structure of the gas generation section 25 at only the respective upstream ends 48, 50 and downstream ends 54, 56 such that the swept-back combustor panels 60 may be self-supporting without external support except for their panel forward and aft end edges 70, 72. Therefore, the circumferential array of the swept-back combustor panels 60 forming the respective annular outer and inner walls 40, 42 is configured in a load-bearing configuration which bears loads generated by the combustion reaction taking place in the combustion chamber 44.

The swept-back combustor panels 60 according to one embodiment may each have opposite first and second surfaces. A portion of the first surface which is free of overlapping, is exposed to the air 36 surrounding the annular combustor assembly 26 and forms a part of a cold side 66 of the respective annular outer and inner walls 40, 42. A portion of the second surface which is free of overlapping, is exposed to the combustion gases in the annular combustion chamber 44 and forms a part of the hot side 64 of the respective annular outer and inner walls 40, 42.

Referring to FIGS. 3, and 5-7), the swept-back combustor panels 60 may overlap such that the first panel side edge 68 (oriented at an obtuse angle A with respect to the panel forward end edge 70) of the respective swept-back combustor panels 60 is located on the cold side 66 of the respective annular outer and inner walls 40, 42, and the second panel side edge 74 (positioned at an acute angle B with respect to the panel forward end edge 70) of the respective swept-back combustor panels 60 is located on the hot side 64 of the respective annular outer and inner walls 40, 42. In such an overlapping configuration, the radial gaps 62 in the spiral patterns, may define an air entry opening 76 (see FIG. 7) on the cold side 66 of the respective annular outer and inner walls 40, 42 which is open toward the upstream end 48 or 50 of the respective annular outer and inner walls 40, 42 for air entry into the gap 62, and may define an air exit opening 78 (see FIG. 7) on the hot side 64 of the respective outer and inner annular walls 40, 42 which is open toward the downstream end 54 or 56 of the respective annular outer and inner walls 40, 42 for air exit from the gap 62.

The swept-back combustor panels 60 according to one embodiment may each include a plurality of ribs 80 on the cold side 66 of the respective annular outer and inner walls 40, 42, projecting radially from the respective swept-back combustor panels 60. The ribs 80 may be arranged for example in a parallel relationship and may or may not be perpendicular to the first panel side edge 68 to form air passages 82 between respective adjacent two of the ribs 80 on the cold side 66 of the respective annular outer and inner walls 40, 42 to guide compressor air 36 surrounding the annular combustor 26 to enter the respective radial gaps 62 for film cooling the hot side 64 of the respective annular outer and inner walls 40, 42.

The ribs 80 generally extend from the first panel side edge 68 toward the second panel side edge 74 or toward the panel aft end edge 72 (see FIG. 5) and at least a number of the ribs 80 terminate at the second panel side edge 74, extending into the respective radial gaps 62 (see FIG. 7) to act as spacers in an overlapping area of respective adjacent two of the swept-back combustor panels 60. It should also be noted that the ribs 80 also act as reinforcing elements to stiffen the swept-back combustor panels 60, allowing the swept-back combustor panels 60 to be very thin for reducing overall engine weight.

Optionally, the swept-back combustor panels 60 according to another embodiment may each be provided with a ridge 84 on the cold side 66 of the respective annular outer and inner walls 40, 42, projecting radially from the respective annular outer and inner walls 40, 42, and extending for example, parallel with the first panel side edge 68, for further stiffening the combustor panels 60. The stiffening ridges 84 may have a height less than a height of the ribs 80. The stiffening ridges 84 may be positioned in the proximity of the first panel side edge 68 and therefore do not affect the passages 82 defined between respective adjacent two of the ribs 80.

Figure 3:
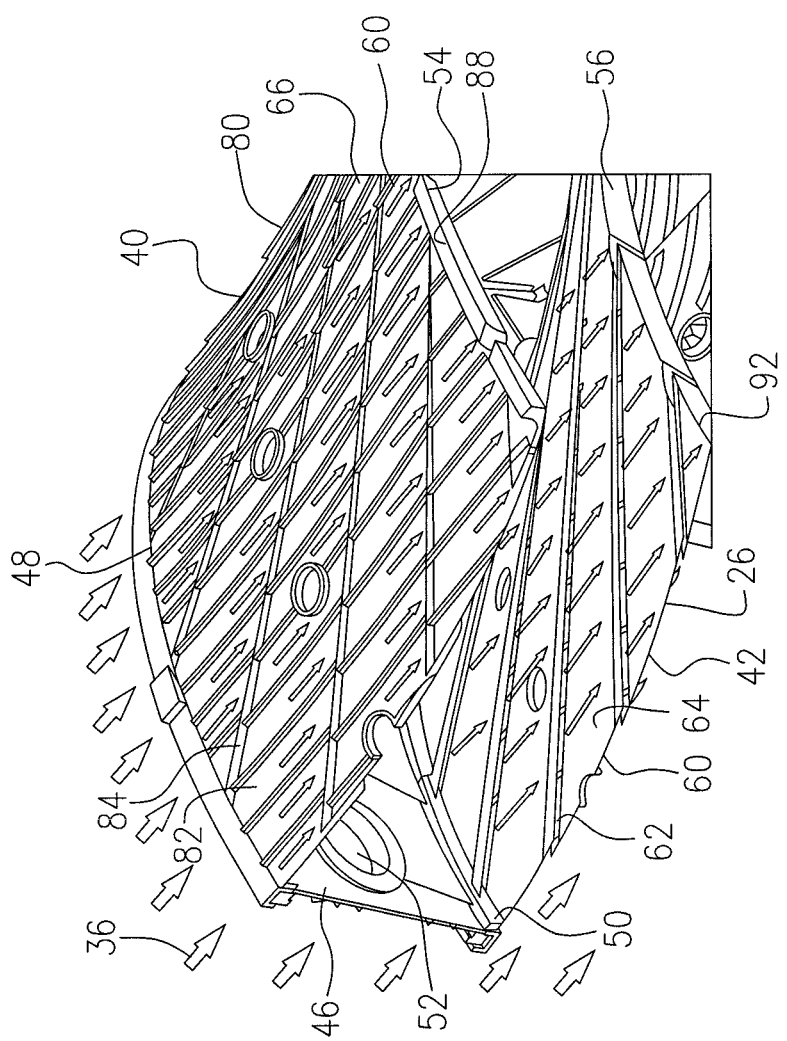
FIG. 3 is a partial perspective view of the combustor assembly of FIG. 2, showing respective annular outer and inner walls thereof formed by a plurality of swept-back combustor panels overlapping one with another.
Figure 4:
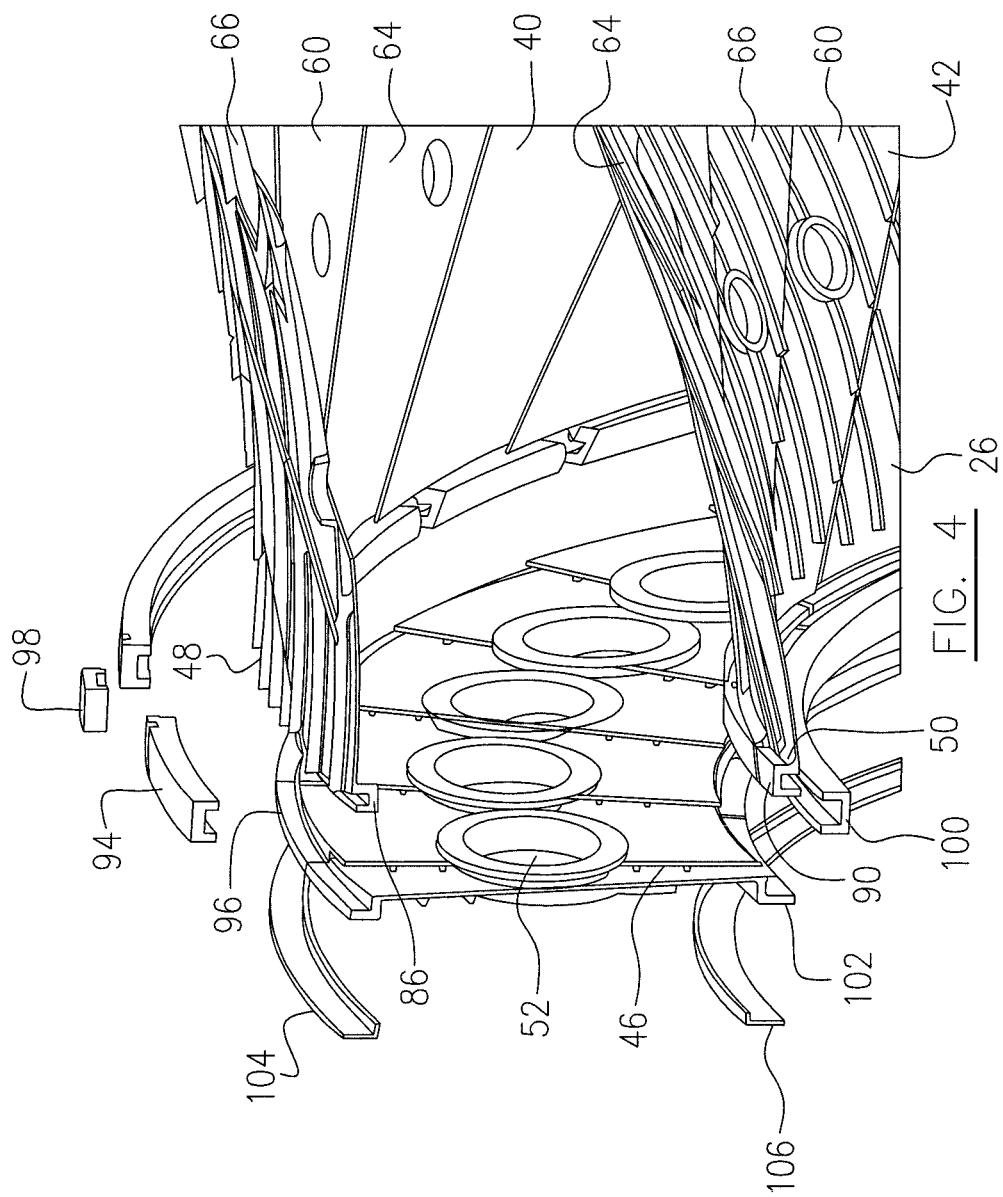
FIG. 4 is a partially exploded partial perspective view of the combustor assembly of FIG. 2, showing the connection of a combustor dome wall with the respective annular outer and inner walls.
Figure 5:
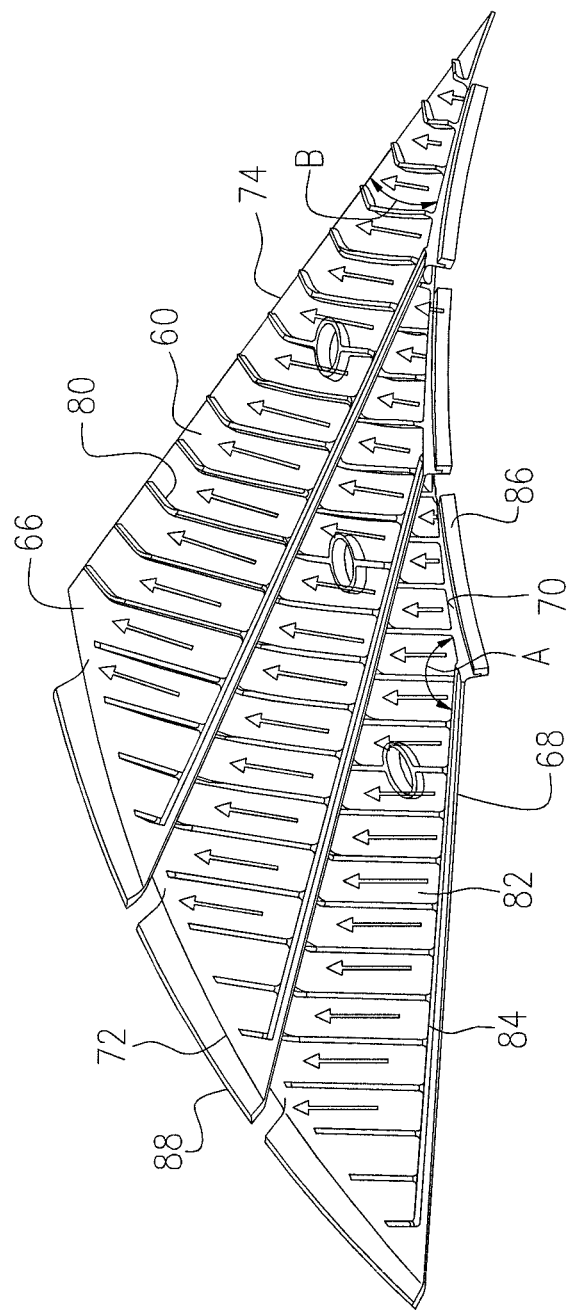
FIG. 5 is a perspective view of three swept-back combustor panels overlapping one with another to form a circumferential section of the annular outer wall of the combustor assembly of FIG. 2, showing cooling air passages formed on the cold side of the annular outer wall.
Figure 6:
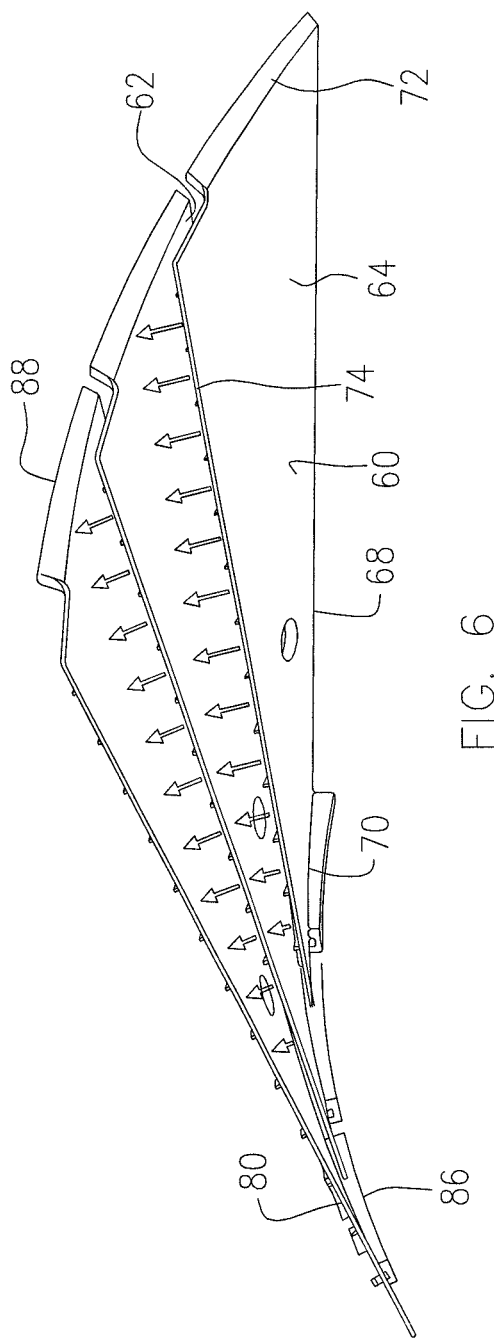
FIG. 6 is a perspective view of three swept-back combustor panels overlapping one with another to form a circumferential section of the combustor assembly of FIG. 2, showing air flow along a hot side of the annular outer wall for film cooling the same.
Figure 7:
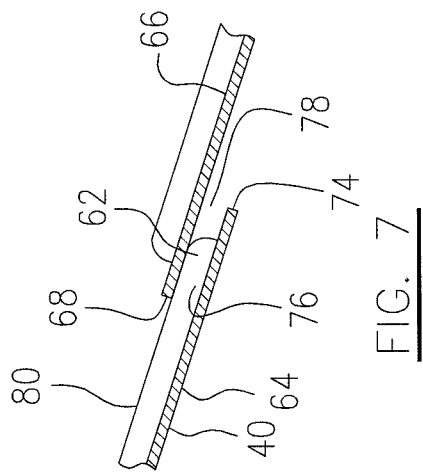
FIG. 7 is a partial cross-sectional view of two adjacent swept-back combustor panels, showing an overlapping area thereof.

Referring to FIGS. 3-4, the swept-back combustor panels 60 according to one embodiment may be divided into first and second groups. The swept-back combustor panels 60 of the first group may each have a first curved configuration matching the circumferential profile of the annular outer wall 40, thereby forming the annular outer wall 40. The swept-back combustor panels 60 of the second group may each have a second curved configuration matching the circumferential profile of the annular inner wall 42, thereby forming the annular inner wall 42.

The swept-back combustor panels 60 of the first group according to one embodiment may each include a first forward engaging member 86 integrated with and extending along the panel forward end edge 70 of the respective swept-back combustor panels 60 of the first group. The first forward engaging member 86 may have a U-shaped cross-section (see FIG. 4) to define a circumferentially extending groove which is open radially outwardly. The swept-back combustor panels 60 of the first group according to one embodiment may each include a first aft engaging member such as a circumferential section of a flange 88 projecting radially outwardly from the panel aft end edge 72 of the respective swept-back combustor panels 60 of the first group.

Similarly, the swept-back combustor panels 60 of the second group may each include a second forward engaging member 90 (see FIG. 4) integrated with and extending along the panel forward end edge 70 of the respective swept-back combustor panels 60 of the second group. The second forward engaging member 90 may have a U-shaped cross-section to define a circumferentially extending groove which is open radially inwardly. The swept-back combustor panels 60 of the second group may each include a second aft engaging member such as a circumferential section of a flange 92 (see FIG. 3) projecting radially inwardly from the panel aft end edge 72 of the respective swept-back combustor panels 60 of the second group.

A first connection ring 94 may be provided for releasably connecting the panels 60 of the first group with an outer peripheral edge 96 of the annular dome wall 46. The first connection ring 94 may define an annular groove which is open radially inwardly for engagement with the first forward engaging member 86 of the respective swept-back combustor panels 60 of the first group and the outer peripheral edge 96 of the annular dome wall 46. The first connection ring 94 may be divided into two or more circumferential sections which can be releasably joined together by respective joints 98 (see FIG. 4) such that the first connection ring 94 can be easily assembled and disassembled for removable connection of the swept-back combustor panels 60 of the first group with dome wall 46.

Similarly, a second connection ring 100 which may have two or more circumferential sections releasably joined together by respective joints, may define an annular groove which is open radially outwardly for releasable engagement with the second forward engaging members 90 of the respective swept-back combustor panels 60 and an inner peripheral edge 102 of the annular dome wall 46, thereby removably connecting the swept-back combustor panels 60 of the second group with the annular dome wall 46. Optionally, additional outer and inner securing rings 104, 106 which have respective L-shaped and reversed L-shaped cross-sections may be provided for connection of the annular dome wall 46 and the respective annular outer and inner walls 40, 42, particularly when the annular dome wall 46 is formed by a plurality of dome wall panels in a circumferential array, as shown in FIG. 4.

As shown in FIG. 2, the first and second aft engaging members (the circumferential sections of the radial flanges 88, 92) of the swept-back combustor panels 60 of the respective first and second groups may be joined by any known or unknown mechanism with respective radial flanges of the nozzle structure 58 positioned downstream of the combustor assembly 26.

Some of the embodiments advantageously provide but are not limited to a combustor cooling system incorporated into the combustion configuration, having air passages without steps for guiding film cooling air into the combustor, replacing convention effusion holes drilled through the combustor walls. Some of the embodiments also provide but are not limited to a combustor configuration which is easy to manufacture and has low weight.

The above description is meant to be exemplary only, and one skilled in the art will recognize that changes may be made to the embodiments described without departing from the scope of the described subject matter. For example, a turbofan gas turbine engine is taken as an example to illustrate an application of the described subject matter. It should be noted that gas turbine engines of other types may also be applicable for the described subject matter. An annular combustor assembly is described and illustrated in the described embodiments, but combustors of other types which have at least one annular combustor wall such as can combustors, may also be applicable for the described subject matter. The swept-back combustor panels may include additional features such as dilution holes extending therethrough. Modifications which fall within the scope of the described subject matter will be apparent to those skilled in the art, in light of a review of this disclosure, and such modifications are intended to fall within the appended claims.

The invention claimed is:

1. A gas turbine engine having a gas generation section including a gas generator case circumscribing a plenum, a combustor mounted in the plenum, the combustor and the gas generator case defining an annulus therebetween, the combustor comprising a single skin liner having at least one annular wall defining a combustion chamber therein, the at least one annular wall formed by a circumferential array of panels in a loadbearing configuration for bearing loads generated by a combustion reaction taking place in the combustion chamber, the panels extending from an upstream end to a downstream end of the at least one annular wall and overlapping one with another to define a plurality of radial gaps between respective adjacent two of the panels, the radial gaps being configured in a spiral pattern and being in fluid communication with the combustion chamber and the annulus outside the combustor to allow air surrounding the at least one annular wall to enter the combustion chamber via the radial gaps for film cooling a hot side of the at least one annular wall, the panels having a radially inner surface exposed to the combustion chamber and an opposed radially outer surface forming an inner flow boundary surface of the annulus.

2. The gas turbine engine as defined in claim 1 wherein the panels each comprise opposite first and second surfaces, a portion of the first surface which is free of said overlapping being exposed to the air surrounding the at least one annular wall and forming a part of a cold side of the at least one annular wall, and a portion of the second surface which is free of said overlapping being exposed to combustion gases in the combustion chamber and forming a part of said hot side of the at least one annular wall.

3. The gas turbine engine as defined in claim 1 wherein each of the panels comprises a first panel side edge extending between a panel forward end edge and a panel aft end edge, and a second panel side edge extending between the panel forward end edge and the panel aft end edge, the first and second panel side edges being oriented at a respective oblique angle with respect to the panel forward end.

4. The gas turbine engine as defined in claim 1 wherein each of the radial gaps in said spiral pattern defines an air entry opening on a cold side of the at least one annular wall being open toward the upstream end of the at least one annular wall, and an air exit opening on said hot side of the at least one annular wall being open toward the downstream end of the at least one annular wall.

5. The gas turbine engine as defined in claim 1 wherein the panels each comprise a plurality of ribs projecting from a first surface of the respective panels, the ribs being arranged to form air passages between respective adjacent two of the ribs to guide the air surrounding the at least one annular wall to enter the respective radial gaps for film cooling a second surface of the respective panels exposed to combustion gases in the combustion chamber.

6. The gas turbine engine as defined in claim 1 wherein the combustor comprises a front connector positioned at the upstream end of the at least one annular wall and an aft connector positioned at the downstream end of the at least one annular wall, the front and aft connectors securing the panels to form said loadbearing configuration.

7. A gas turbine engine having a gas generator section including an annular combustor disposed in an annulus defined radially between annular outer and inner cases of the gas generator section, the annular combustor comprising a single skin liner having an annular outer wall and an annular inner wall to define an annular combustion chamber radially therebetween, each of the annular outer and inner walls being formed by a circumferential array of panels in a loadbearing configuration for bearing loads generated by a combustion reaction taking place in the annular combustion chamber, the panels extending from an upstream end to a downstream end of the respective annular outer and inner walls and overlapping one with another to define a plurality of radial gaps between respective adjacent two of the panels, the radial gaps in the respective annular outer and inner walls being configured in spiral patterns and being in fluid communication with the annular combustion chamber and a space outside the annular combustor to allow air in the annulus and surrounding the annular combustor to enter the annular combustion chamber via the radial gaps for film cooling a hot side of the respective annular outer and inner walls, the panels having a radially inner surface exposed to the annular combustion chamber and an opposed radially outer surface forming a radially inner flow boundary surface of the annulus.

8. The gas turbine engine as defined in claim 7 wherein the radial gaps in the annular outer wall are configured in a first spiral pattern in which the gaps extend from the upstream end to the downstream end of the annular outer wall and incline toward a first circumferential direction, and wherein the radial gaps in the annular inner wall are configured in a second spiral pattern in which the gaps extend from the upstream end to the downstream end of the annular inner wall and incline toward a second circumferential direction opposite the first circumferential direction.

9. The gas turbine engine as defined in claim 7 wherein each of the radial gaps in the respective annular outer and inner walls defines an air entry opening on a cold side of the respective annular outer and inner walls and being open toward the upstream end of the respective annular outer and inner walls, and an air exit opening on said hot side of the respective annular outer and inner walls and being open toward the downstream end of the respective annular outer and inner walls.

10. The gas turbine engine as defined in claim 7 wherein the panels each comprise a plurality of ribs radially projecting from the respective panels, the ribs being arranged to form air passages on a cold side of the respective annular outer and inner walls, the passages being defined between respective adjacent two of the ribs to guide the air surrounding the annular combustor to enter the respective radial gaps for film cooling said hot side of the respective annular outer and inner walls.

11. The gas turbine engine as defined in claim 10 wherein at least a number of the ribs on the respective panels extend into the respective radial gaps to act as spacers in an overlapping area of respective adjacent two of the panels.

12. The gas turbine engine as defined in claim 7 wherein the annular combustor comprises an annular dome wall having an outer peripheral edge and an inner peripheral edge, a first front connector connecting the outer peripheral edge of the annular dome wall to the upstream end of the annular outer wall and a second front connector connecting the inner peripheral edge of the annular dome wall to the upstream end of the annular inner wall.

13. The gas turbine engine as defined in claim 7 wherein each of the panels comprises a first panel side edge extending between a panel forward end edge and a panel aft end edge, and a second panel side edge extending between the panel forward end edge and the panel aft end edge, the first and second panel side edges being oriented at a respective oblique angle with respect to the panel forward end edge.

14. The gas turbine engine as defined in claim 13 wherein the panels overlap with the first panel side edge of the respective panels being positioned on a cold side of the respective annular outer and inner walls and being exposed to the air surrounding the annular combustor, and the second panel side edge of the respective panels being positioned on said hot side of the respective annular outer and inner walls and being exposed to combustion gases in the annular combustion chamber, the first panel side edge being oriented at an obtuse angle with respect to the panel forward end edge of the respective panels and the second panel side edge being oriented at an acute angle with respect to the panel forward end edge.

15. The gas turbine engine as defined in claim 7 wherein the panels comprise a first group of the panels, the panels of the first group having a first curved configuration matching a circumferential profile of the annular outer wall and a second group of the panels, the panels of the second group having a second curved configuration matching a circumferential profile of the annular inner wall.

16. The gas turbine engine as defined in claim 15 wherein the panels of the first group each comprise a first forward engaging member integrated with and extending along a panel forward end edge of the respective panels of the first group, the first forward engaging member having a U-shaped cross section to define a circumferentially extending groove being open radially and outwardly for engagement with a first connection ring which removably connects the panels of the first group with an outer peripheral edge of an annular dome wall.

17. The gas turbine engine as defined in claim 15 wherein the panels of the second group each comprise a second forward engaging member integrated with and extending along a panel forward end edge of the respective panels of the second group, the second forward engaging member having a U-shaped cross section to define a circumferentially extending groove being open radially and inwardly for engagement with a second connection ring which removably connects the panels of the second group with an inner peripheral edge of an annular dome wall.

18. The gas turbine engine as defined in claim 15 wherein the panels of the first group each comprise a first aft engaging member projecting radially outwardly from a panel aft end edge of the respective panels of the first group, and wherein the panels of the second group each comprise a second aft engaging member projecting radially inwardly from a panel aft end edge of the respective panels of the second group.

\* \* \* \* \*